United States Patent [19]

Kawai

[11] Patent Number: 5,677,583

[45] Date of Patent: Oct. 14, 1997

[54] ELECTRIC MOTOR HAVING ROTOR WITH OFFSET AGAINST STATOR

[75] Inventor: Teruo Kawai, Tokyo, Japan

[73] Assignee: Nihon Riken Co., Ltd., Tokyo, Japan

[21] Appl. No.: 527,341

[22] Filed: Sep. 12, 1995

[51] Int. Cl.⁶ .............................. H02K 7/02; H02K 7/075
[52] U.S. Cl. ........................... 310/80; 310/81; 310/82; 310/156
[58] Field of Search .................... 310/80, 81, 82, 310/156, 261

[56] References Cited

U.S. PATENT DOCUMENTS

| 4,142,119 | 2/1979 | Madey | 310/46 |
| 4,433,261 | 2/1984 | Nashiki et al. | 310/156 |
| 4,709,362 | 11/1987 | Cole | 310/81 |
| 4,728,837 | 3/1988 | Bhadra | 310/80 |
| 5,030,866 | 7/1991 | Kawai | 310/82 |

*Primary Examiner*—Steven L. Stephan
*Assistant Examiner*—Tran N. Nguyen
*Attorney, Agent, or Firm*—Wenderoth, Lind & Ponack

[57] ABSTRACT

A electric motor is capable of increased output torque and efficiency in utilizing magnetic energy. The electric motor includes a plurality of electromagnets arranged annularly, each of the electromagnets having a magnetically permeable armature and a winding therearound, and a rotor formed of magnetic material, the rotor being rotatably supported and surrounded by the annularly arranged electromagnets. An output shaft is fixed to the rotor for outputting rotational motion of the rotor. At least one portion of the outer periphery of the rotor is able to approach or contact an energized one of the electromagnets by attracting force thereof. A current control device energizes the electromagnets in a predetermined sequence and timing. At least one electromagnet, among the annularly arranged electromagnets, which is situated at a downstream or forward side of the closest point to the electromagnets on the outer periphery of the rotor relative to the rotational direction thereof, is energized.

4 Claims, 18 Drawing Sheets

O: CENTER OF ANNULARLY
ARRANGED ELECTRO-
MAGNETS 101
OR: CENTER OF ROTOR 102

ELECTRIC MOTOR HAVING ROTOR WITH OFFSET AGAINST STATOR

BACKGROUND OF THE INVENTION

1. Field of the Invention

The present invention relates to an electric motor with a rotor having an offset against a stator, and particularly to an electric motor with the above rotor, further utilizing convergence of magnetic flux by at least one permanent magnet fixed to the rotor and a stator including a plurality of electromagnets which are sequentially energized.

2. Description of the Related Art

As a conventional power generating apparatus utilizing conversion of electric energy to kinetic energy, various types of electric motors have been known in the art. An existing electric motor typically comprises a fixed annular electromagnet, i.e. a stator, and a rotating electromagnet supported therein, i.e. a rotor. As the rotor is rotated by a mutual attracting force between the stator and the rotor, a torque of the rotor is output as a motive power. In this type of an electric motor, the rotor is continuously attracted by the surrounding annular stator with a certain gap therebetween.

In attraction of a magnet of a material such as iron, the maximum attracting force may appear immediately before a contact between the rotor and stator because the magnetic force is in proportion to an inverse of the square of a distance therebetween. With the conventional electric motors, however, there may exist a drawback that, as mentioned above, the attracting force between the rotor and the stator may not be sufficiently utilized as a rotor torque because the rotor is usually spaced apart from the outside stator by a certain distance.

In view of this, the present inventor proposed an improved power generating apparatus disclosed in Japanese Patent Laid-open Publication No. 61-116966. As shown in FIGS. 28 and 29, such apparatus comprises a plurality of electromagnets 101, which are arranged annularly, and a ring-shaped rotor 102 disposed in annularly arranged electromagnets 101. The rotor 102 is attracted to electromagnets 101 energized by a current control device 110, which controls timing and sequence for feeding current to the electromagnets 101.

The operation of the apparatus is as follows. When three electromagnets 101a, 101b, 101c are energized by the current control device 110, a portion of the outer periphery of the rotor 102 is attracted by the electromagnet 101b. Then, the adjacent electromagnet 101d is energized while the electromagnet 101a is demagnetized. The rotor 102 rotates along the inner periphery of the electromagnets 101 to be attracted by the electromagnet 101c. When the electromagnet 101e is energized, the rotor 102 is moved to be attracted to the electromagnet 101d.

In such a sequence, the rotor 102 rotates along the inner surface of the electromagnets 101, while attracted by the electromagnets one by one. The motion of the rotor 102 is output by an output shaft (not shown). Such power generating apparatus has been proved to have greater output compared with corresponding conventional electric motors. However, such apparatus will have significant energy loss during rotation of the rotor 102.

As shown in FIG. 28, when three electromagnets 101 are energized, the attraction force between the rotor 102 and the electromagnets 101a, 101b, 101c is applied both at a forward side portion S2, and a rearward side portion S1 relative to direction of rotation of the rotor 102. As a result, the attracting force to the rotor 102 at the rearward side portion S1 becomes a force preventing rotation of the rotor 102.

SUMMARY OF THE INVENTION

An object of the present invention is to provide an electric motor capable of increasing output torque and efficiency utilizing magnetic energy.

Another object of the present invention is to provide an electric motor capable of smoother rotational movement of a rotor by cancelling a resisting force imparted against a rotor torque.

To accomplish these and other objects of the invention, an electric motor according to one embodiment of the present invention comprises a plurality of electromagnets arranged annularly, each of the electromagnets having a magnetically permeable armature and a winding therearound, a rotor formed of magnetic material, the rotor being rotatably supported and surrounded by the annularly arranged electromagnets. An output shaft fixed to the rotor for outputting rotational motion of the rotor. At least one portion of the outer periphery of the rotor is able to approach or contact one of the energized electromagnets by attracting force thereof. The electromagnets are energized in a predetermined sequence and timing to achieve engergization of at least one electromagnet, among the annularly arranged electromagnets, which is situated at a forward or downstream side of the closest point to the electromagnets on the outer periphery of the rotor relative to the rotational direction thereof.

It is preferable that the rotor comprises a substantially cylindrical member formed of magnetic material.

The cylindrical rotor may be rotatably supported by an eccentric output shaft aligned centrally of the annularly arranged electromagnets.

Preferably, a pair of permanent magnet members are installed on the inner surface of the cylindrical rotor in the circumferential direction thereof.

The rotor may further include a pair of substantially circular plates of magnetic material and an axis integrally fastening the circular plates to each other.

Each of the substantially circular plates may preferably comprise a plurality of protruding portions, each defined by a radially recessed outer peripheral surface portion of a respective circular plate.

At least two protruding portions may further be provided at symmetrical positions on the outer periphery of each circular plate with respect to the center axis of the rotor.

Further, it is preferable that a plurality of substantially arc-shaped permanent magnet members are installed at respective of the protruding portions, each of the permanent magnet members being disposed along the radially recessed outer peripheral surface of the circular plate of the rotor.

The permanent magnet members may be disposed in a substantially half portion of the rotor, that includes the point closest to the electromagnets on the outer periphery of the rotor.

According to another aspect of the present invention, an electric motor comprises a plurality of electromagnets arranged annularly, each of the electromagnets having a magnetically permeable armature and a winding therearound, a substantially hollow cylindrical rotor formed of magnetic material, the cylindrical rotor being rotatably supported and surrounded by the annularly arranged electromagnets. A pair of substantially arc-shaped permanent magnet members are disposed on an inner surface of the substantially cylindrical rotor. An output shaft formed of non-ferrous material is fixed to the rotor at an eccentric point thereof so that at least one portion of the outer periphery of the rotor is able to approach or contact one of the electromagnets by attracting force thereof during rotation. A pair of side frames support the output shaft with ball bearings installed therein. The side frames are securely disposed on a base frame. A current control device supplies electric current to energize the electromagnets in a predetermined sequence and timing to achieve energization of at least one electromagnet, among the annularly arranged electromagnets, which is situated at a downstream or forward side of the closest point to the electromagnets on the outer periphery of the rotor relative to the rotational direction thereof.

According to further aspect of the present invention, an electric motor comprises a plurality of electromagnets arranged annularly, each of the electromagnets having a magnetically permeable armature and a winding therearound, a rotor including a pair of substantially circular plates, each of the circular plates having a plurality of radially protruding portions and an output shaft formed of non-ferrous material securely fastening the circular plates centrally thereof, with the radially protruding portions of each of the circular plates disposed parallel to each other. A plurality of substantially arc-shaped permanent magnet members are disposed at the respective of radially protruding portions. A pair of side frames support the output shaft of the rotor with ball bearings installed therein. The side frames are securely disposed on a base frame. A current control device supplies electric current for energizing the electromagnets in a predetermined sequence and timing to achieve energization of at least one electromagnet, among the annularly arranged electromagnets, which is situated at a downstream or forward side of the closest point to the electromagnets on the outer periphery of the rotor relative to the rotational direction thereof.

Still other objects and advantages of the present invention will become readily apparent to those skilled in this art from the following detailed description, wherein only preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF PREFERRED EMBODIMENTS AND BEST MODE FOR CARRYING OUT THE INVENTION

Figure 1:
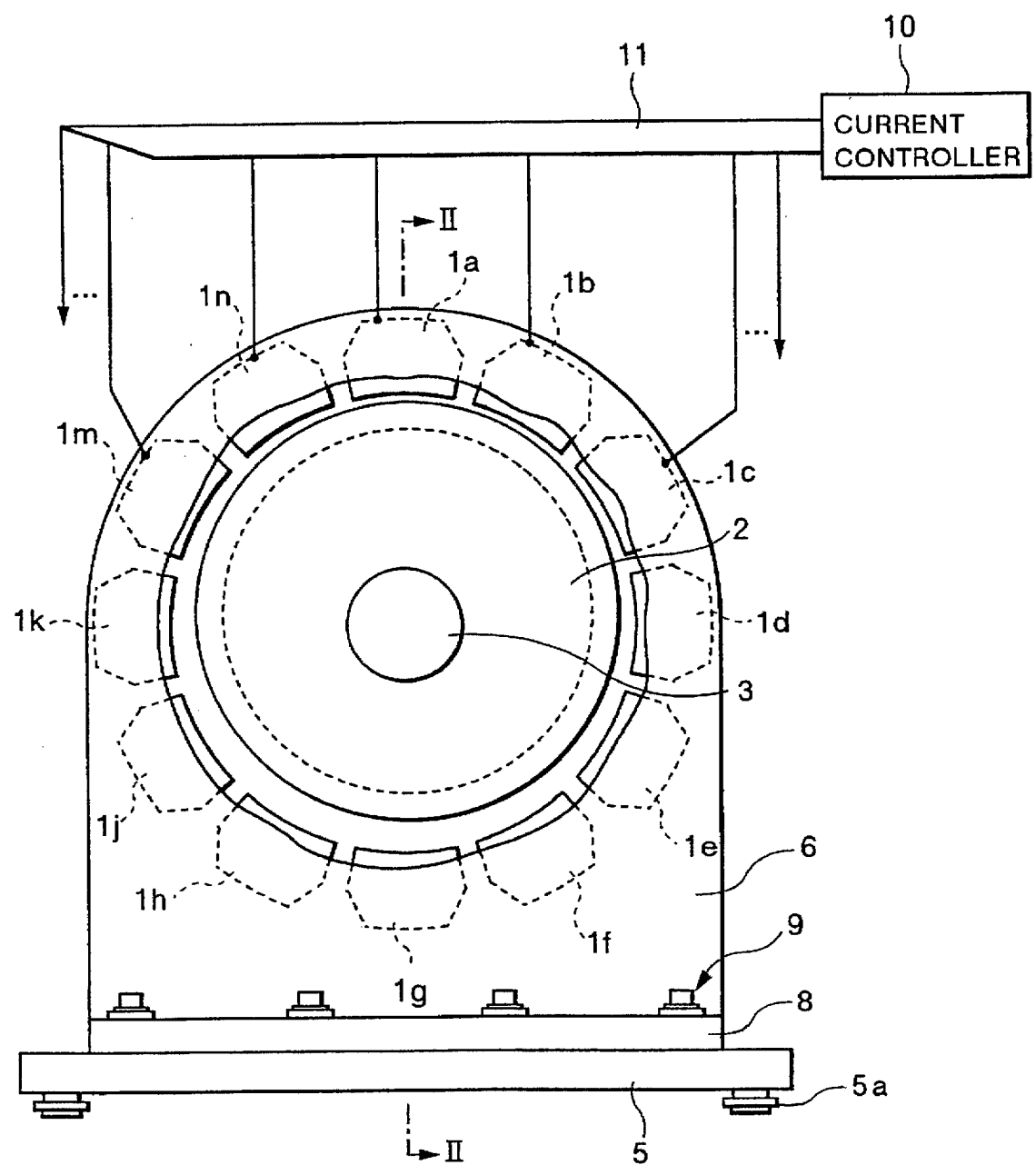
FIG. 1 is a partially-exploded elevation view of an electric motor according to one embodiment of the present invention.
Figure 2:
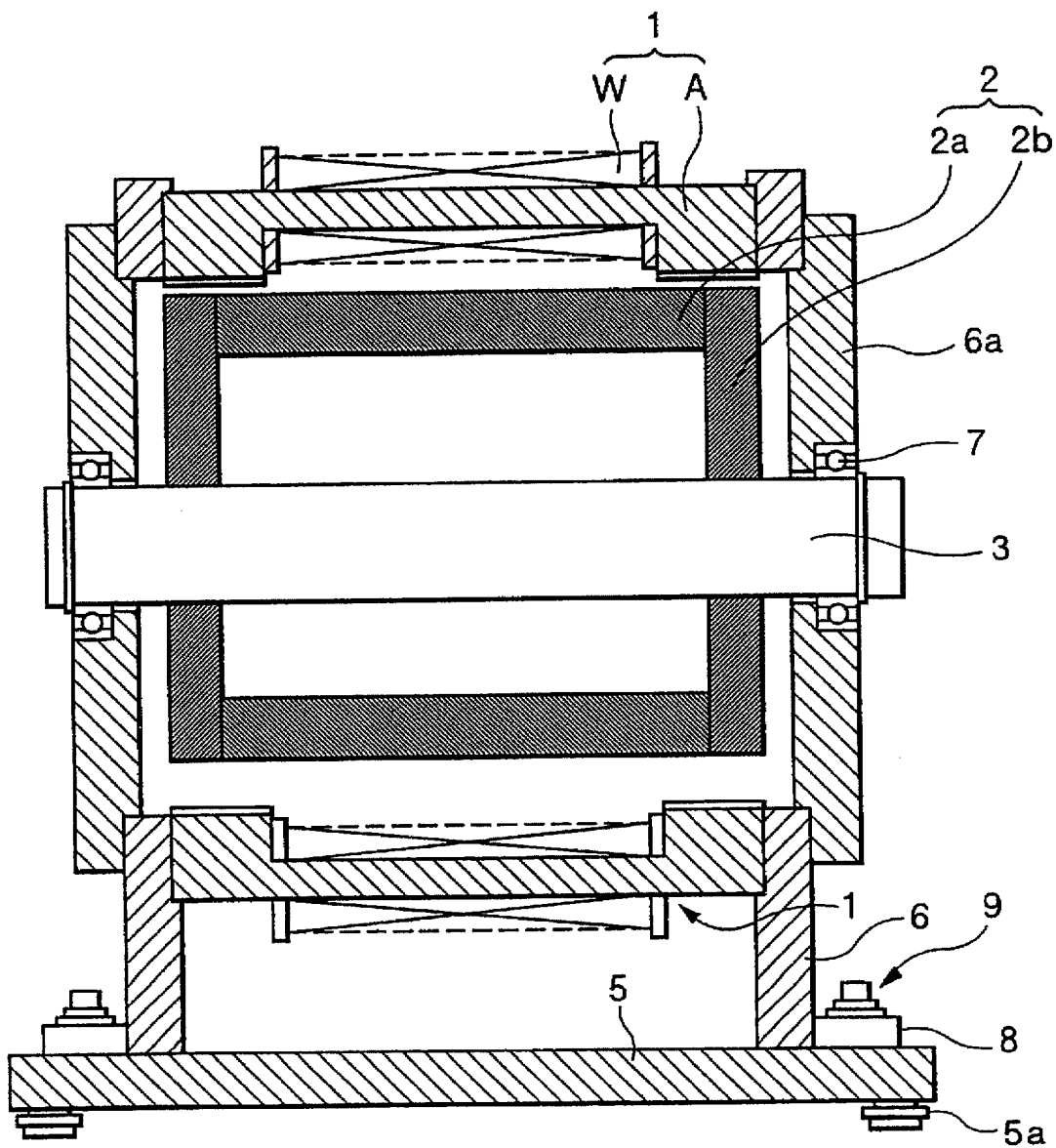
FIG. 2 is a cross-sectional view of the electric motor in FIG. 1.

Referring to FIGS. 1 and 2, an electric motor according to one embodiment of the present invention generally comprises a plurality of electromagnets $1a$ to $1n$, a hollow cylindrical rotor 2, an output shaft 3, a base frame 5, and side frames 6.

The annularly arranged electromagnets $1a$ to $1n$ are provided between the side frames 6. Each of the electromagnets $1a$ to $1n$ comprises a magnetically permeable armature A and a winding W therearound. It is apparent that the number of the electromagnets 1 should not be limited to the number such as twelve (12) as described above, but may be chosen from suitable numbers to the required characteristics of a motor.

The rotor 2 comprises a substantially hollow cylindrical member $2a$ and a pair of end plates $2b$ integrally fixed at opposite ends thereof. The cylindrical member $2a$ and the end plates $2b$ are formed of magnetic material. The output shaft 3 is disposed through both end plates $2b$ parallel to the axis of the cylindrical member $2a$. The output shaft 3 is positioned eccentric alloy of the end plates $2b$, so that one portion on the outer periphery of the cylindrical member $2a$ is positioned close to or in contact with the inner periphery of the electromagnets 1 surrounding the rotor 2.

The output shaft 3 is rotatably supported by a pair of ball bearings 7 installed in each of end plates $6a$ of side frames 6. Other conventional supporting means than ball bearings 7, such as bushings or roller bearings, may be employed to support the output shaft 3.

The side frames 6 are secured to the base frame 5 via ribs 8 by conventional fastening means such as bolts 9. The ribs 8 are fixed to the side frames 6 by a conventional method such as welding. The base frame 5 includes four feet or supports $5a$ that are generally made of rubber or the like, and may be capable of having the height thereof adjusted.

As shown in FIG. 1, a current control device 10 comprises switching means such as mechanical relays and semiconductor switches, and a controller (not shown) as a switching control means, including a microprocessor, an interface circuitry and so forth. Each of the electromagnets $1a$ to $1n$ is connected to the current control device 10 by electric lines or mines 11. The current control device 10 feeds each of the annularly arranged electromagnets $1a$ to $1n$ with electric current to sequentially energize them.

Figure 3:
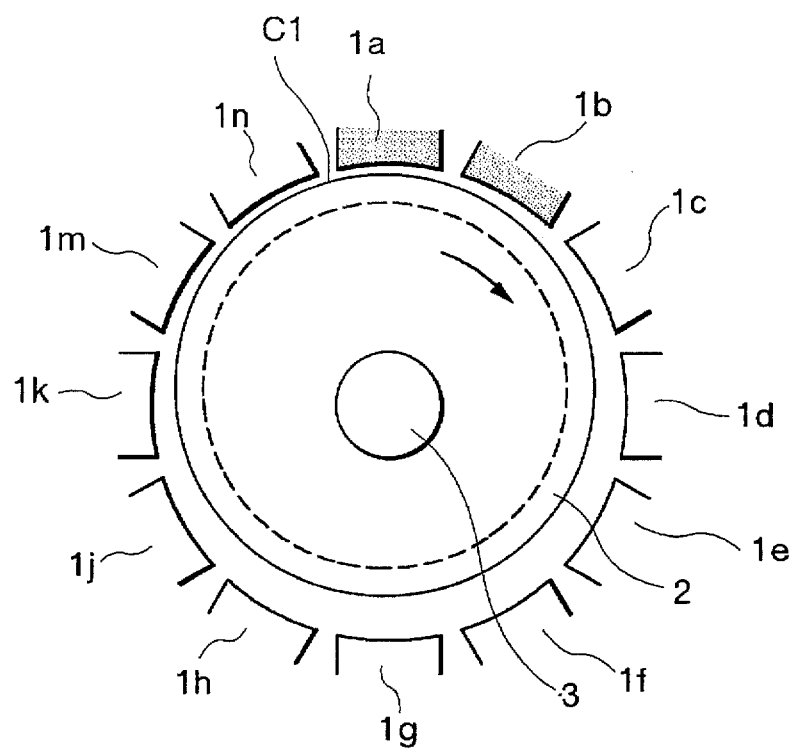
FIGS. 3 through 8 are schematic views illustrating operation of the embodiment of FIG. 1.
Figure 4:
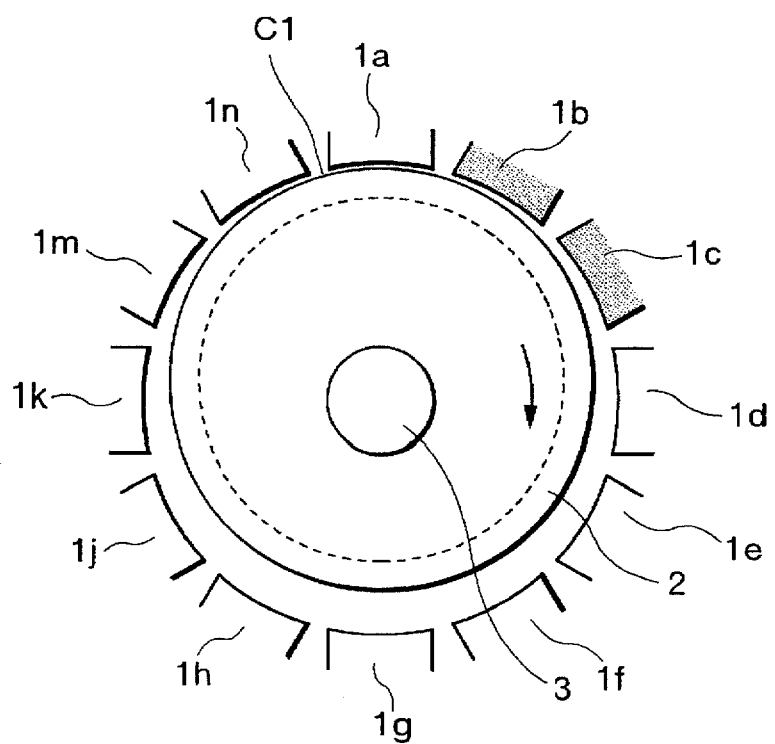
Figure 5:
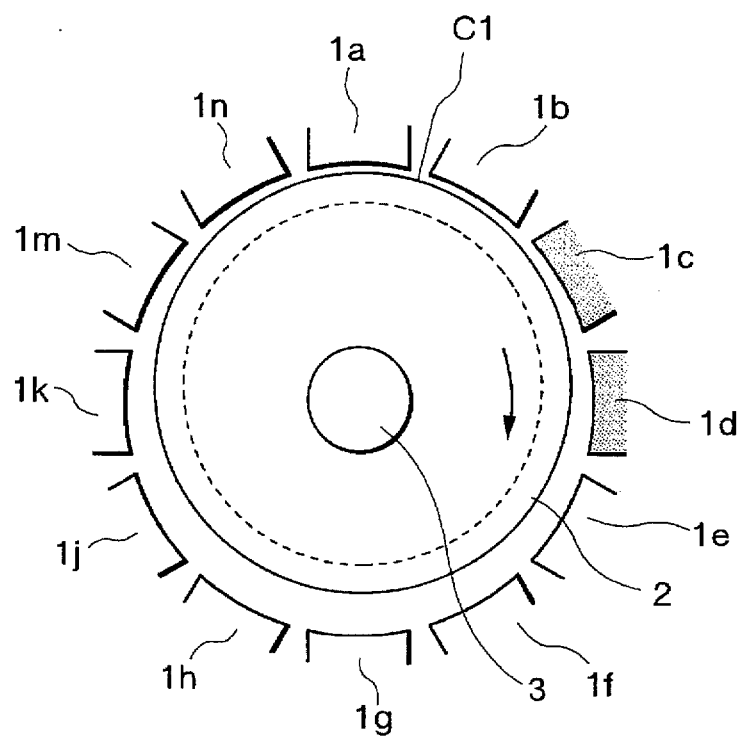
Figure 6:
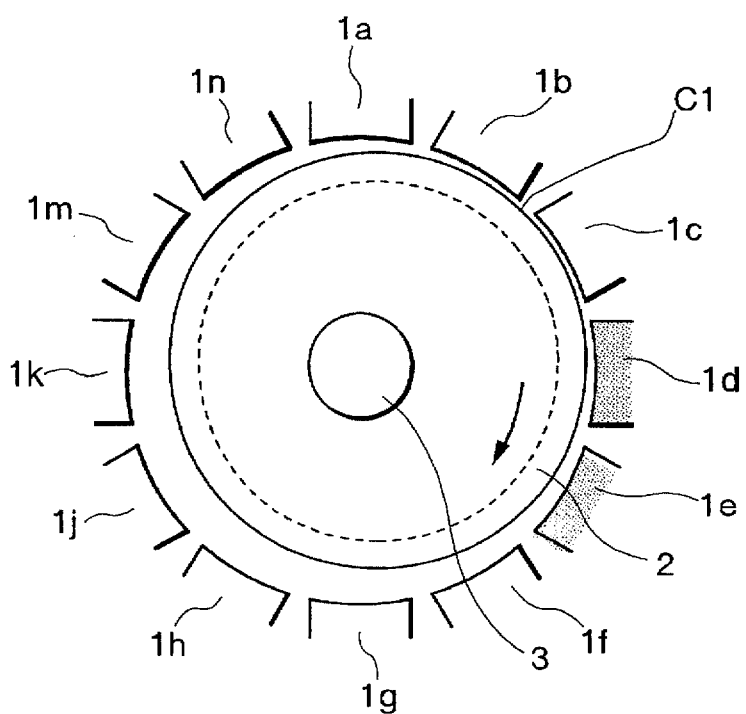
Figure 7:
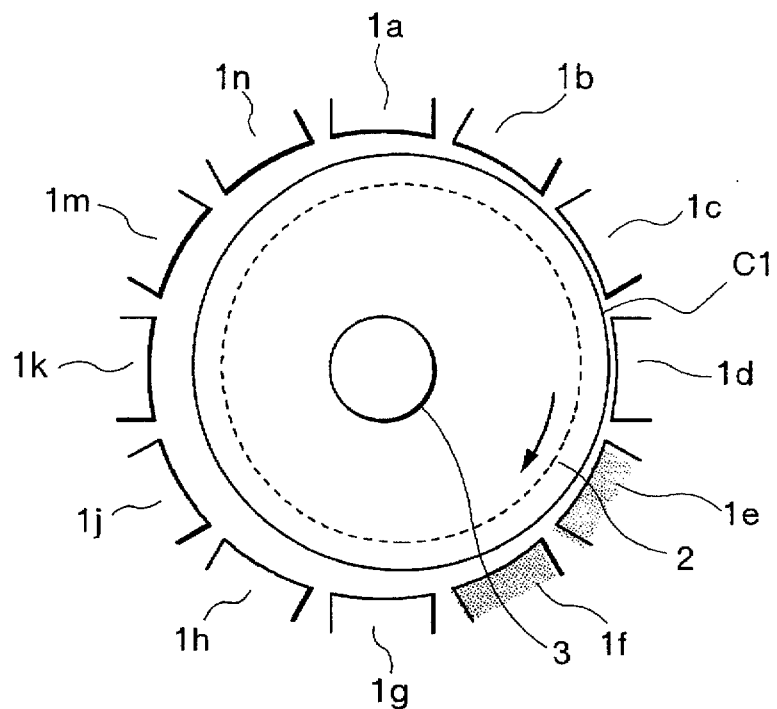
Figure 8:
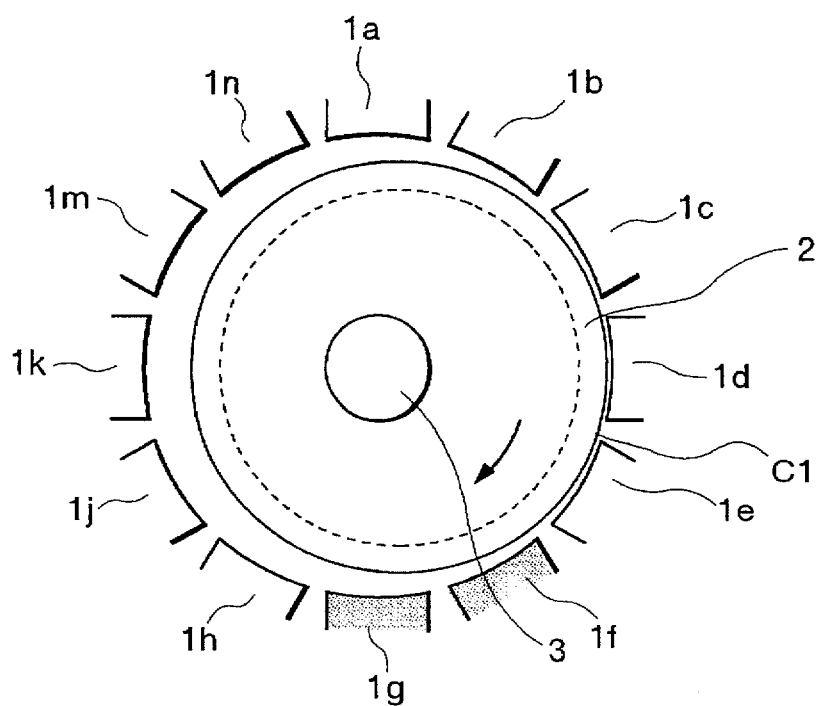

The operation of the above first embodiment of the present invention will be described herebelow. Referring to FIGS. 3 and 4, the rotor 2 arranged in the electromagnets $1a$ to $1n$ rotates clockwise along the inner periphery of the electromagnets $1a$ to $1n$. As shown in FIG. 3, the output shaft 3 is positioned at the center of annularly arranged electromagnets $1a$ to $1n$ while the output shaft 3 is eccentrically fixed to the rotor 2, so that a certain portion of the outer periphery of the rotor 2 is situated close to or contacts the inner periphery of the electromagnets $1a$ to $1n$. This embodiment shows a configuration in which two electromagnets, situated downstream of portion C1 of the rotor 2 which is closest to the inner periphery of the electromagnets relative to the rotational direction of rotor 2, are simultaneously excited. In FIG. 3, the electromagnets 1a and 1b are energized and a radially outer portion C1 of the rotor 2 that is closest to the electromagnets is located at an intermediate point between the electromagnets 1a and 1n. In FIG. 4, the exciting current to the electromagnet 1a is shut down and, alternatively, the electromagnet 1c is energized since further excitation of the electromagnet 1a may cause an undesirable attraction force preventing the rotor 2 from rotating in the clockwise direction. The electromagnet 1b is kept energized at this time. In FIG. 5, the rotor 2 is attracted by the electromagnets 1c and 1d to rotate clockwise and the radially outer portion C1 moves to a position between the electromagnets 1a and 1b after being rotated thirty (30) degrees. Subsequently, as shown in FIG. 6, the electromagnets 1d and 1e positioned downstream of portion C1 are energized to apply attractive force to the rotor 2 as rotational torque. In this rotation sequence of the rotor 2, it is essential that the electromagnets 1 situated downstream, relative to the rotational direction of the rotor 2, of the portion of the outer periphery of the rotor 2 closet to the inner periphery of the annularly arranged electromagnets 1a to 1n, be energized. According to this configuration, portion C1 of the rotor 2 is able to be always attracted by the electromagnets positioned downstream thereof relative to the rotational direction thereof. Thus, the rotational torque of the rotor 2 can be created efficiently.

Figure 9:
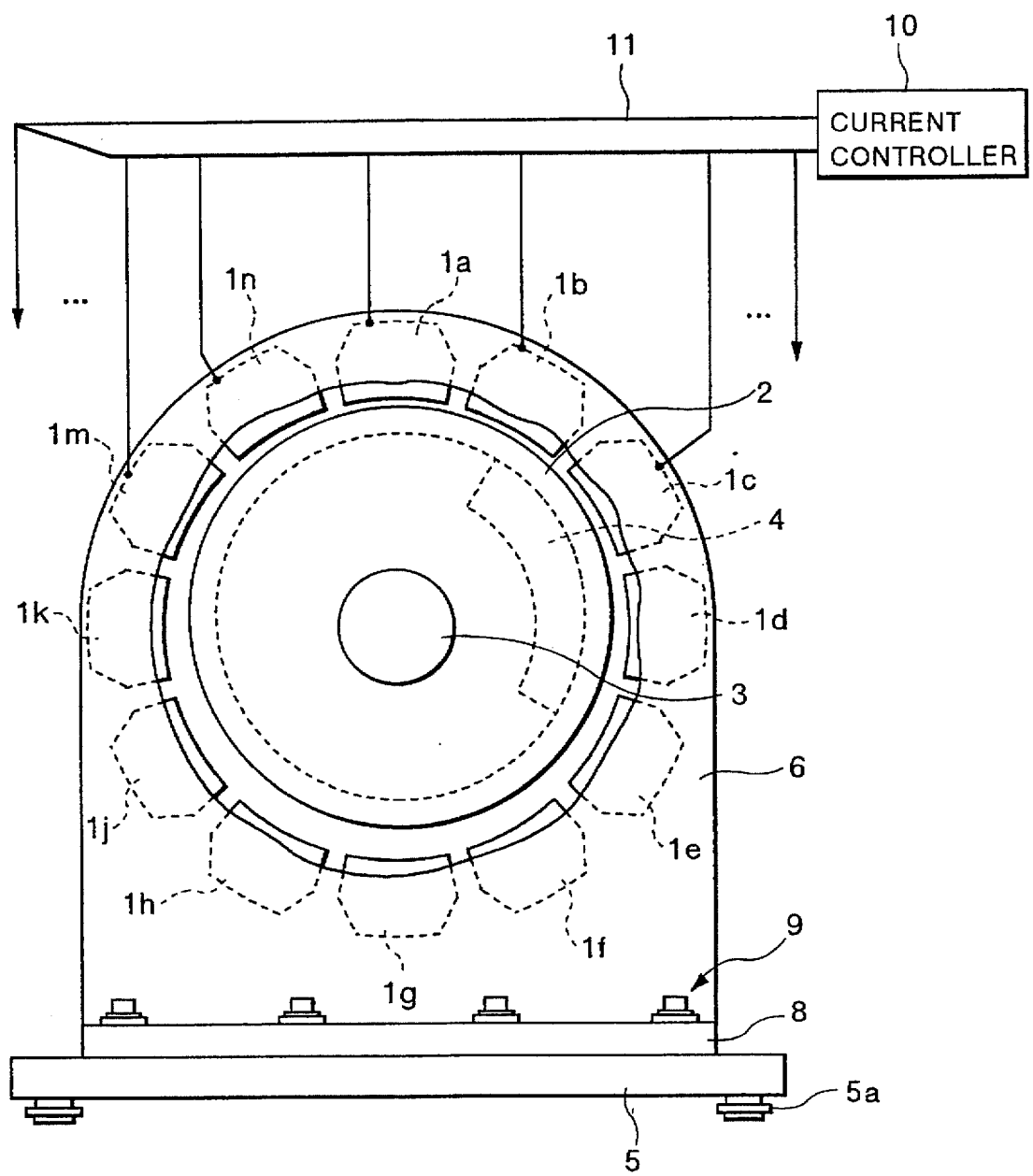
FIG. 9 is a partially-exploded elevation view of an electric motor according to another embodiment of the present invention.

In FIG. 9, an alternative construction of the preceding embodiment is described. As shown in FIG. 9, the basic configuration is almost the same as the aforementioned electric motor. However, the electric motor in FIG. 9 includes a substantially arc-shaped permanent magnet member 4 integrally disposed on the inner surface of the hollow cylindrical member 2a of the rotor 2. The permanent magnet member 4 is preferably disposed in a substantially half portion of the rotor 2 including the closest point on the outer periphery of the rotor 2 to the electromagnets. The gap between the permanent magnet member 4 and the electromagnets 1a to 1n thus is minimized to improve efficiency of creation of rotation torque by the electromagnets 1a to 1n. According to this embodiment, the permanent magnet member 4 contributes to increase the flux between the electromagnets and the rotor 2 for attractive force to the rotor 2. Thereby, output torque of the rotor 2 can be increased.

Figure 10:
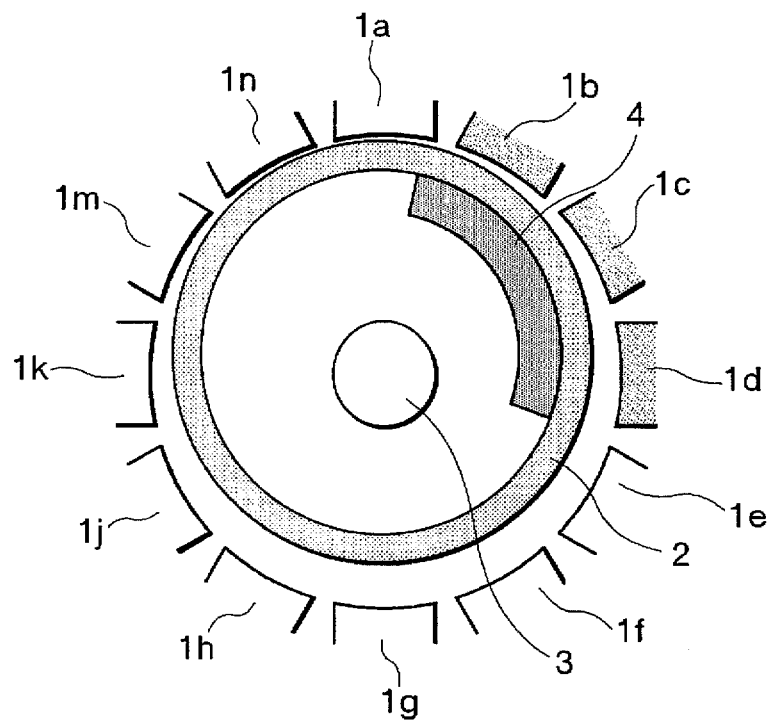
FIGS. 10 to 17 are schematic views illustrating operation of the embodiment of FIG. 9.
Figure 11:
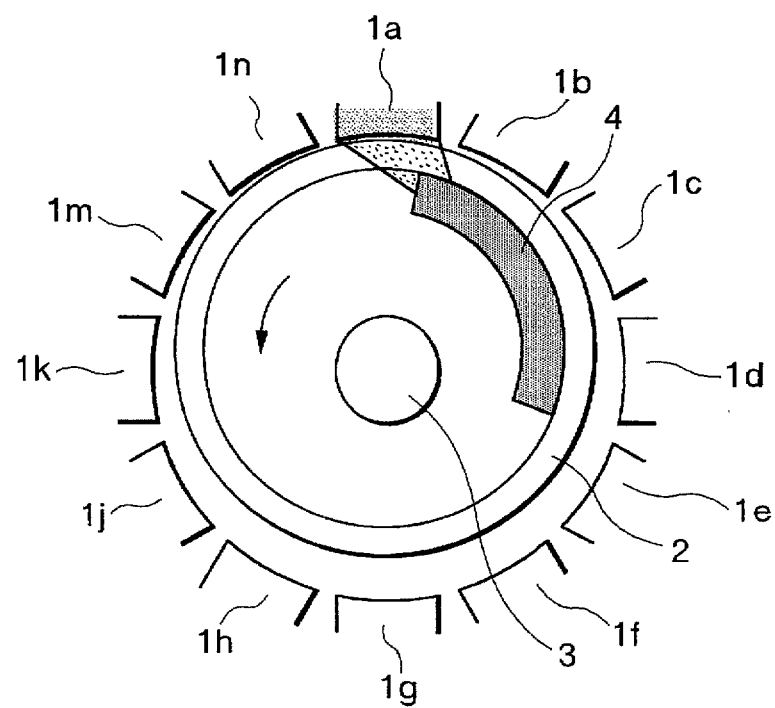
Figure 12:
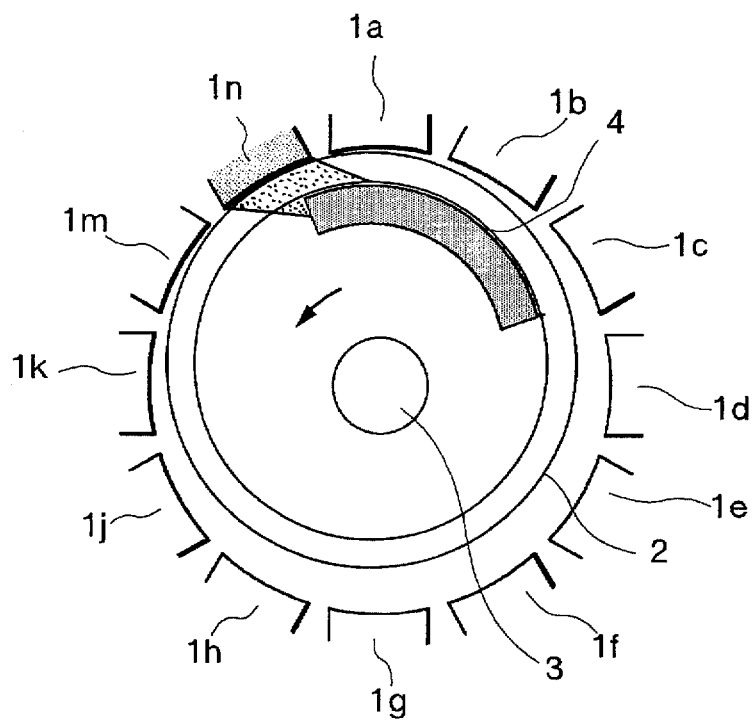
Figure 13:
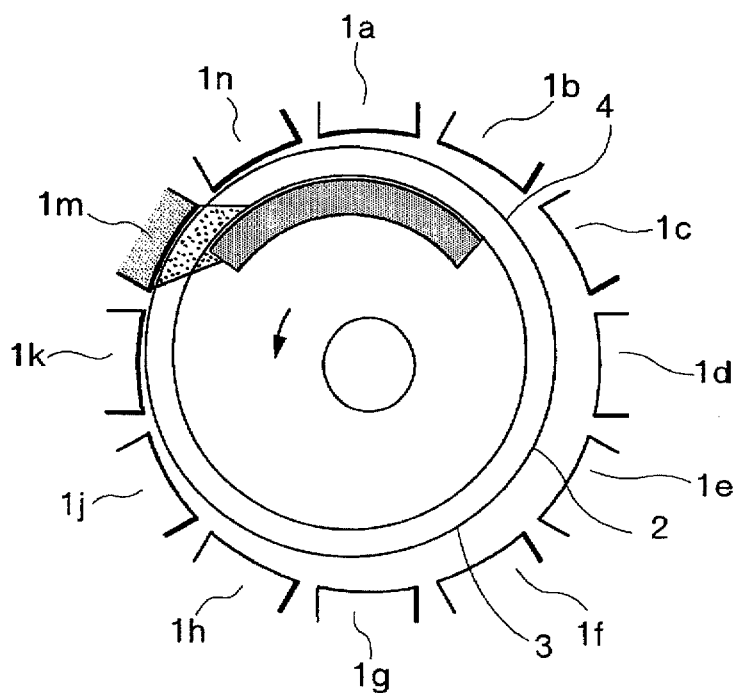

The operation of the embodiment of FIG. 9 of the invention is as follows. FIG. 10 shows a condition with the rotor 2 stabilized while the permanent magnet member 4 opposes electromagnets 1b, 1c and 1d which are not energized. Thus, magnetic flux of the permanent magnet member 4 simply attracts the electromagnets 1b to 1d. In FIG. 11, the electromagnets 1a is energized to cause counterclockwise rotation of the rotor 2 by attraction force thereby. In this aspect, magnetic flux of the permanent magnet member 4 is converged at the energized electromagnet 1a. In FIG. 12, the rotor 2 has rotated to a position where the leading end of the permanent magnet member 4 is beyond the electromagnet 1a, which has been turned off. Electromagnet 1n adjacent to the electromagnet 1a is alternatively turned on so as to further attract the rotor 2 in the counterclockwise direction. Then, as shown in FIG. 13, the electromagnet 1m adjacent to the electromagnet 1n is energized to attract the permanent magnet member 4 of the rotor 2. According to the operation described above, the rotor 2 rotates counterclockwise by being sequentially attracted by the electromagnets 1a to 1n. Since the magnetic flux of the permanent magnet member 4 is converged at an energized electromagnet in addition to the magnetic flux of the electromagnet itself, the rotation torque can be increased as compared with the preceding embodiment. Furthermore, similar to the first embodiment, the rotor 2 will not be affected by preventive force against its rotation because only the electromagnets positioned downstream or forwardly of the rotor 2, in the rotational direction thereof, are energized to attract the rotor 2.

Figure 14:
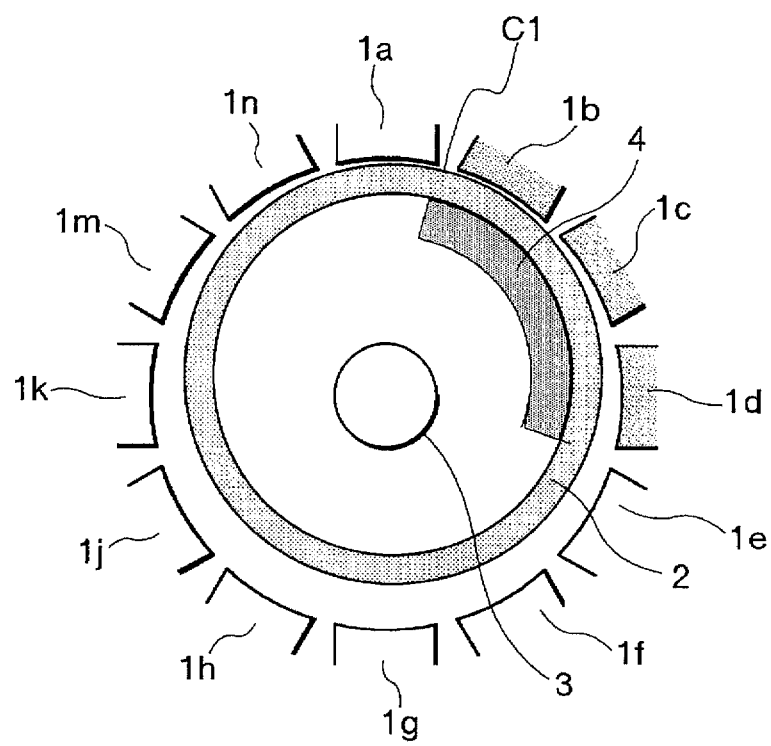
Figure 15:
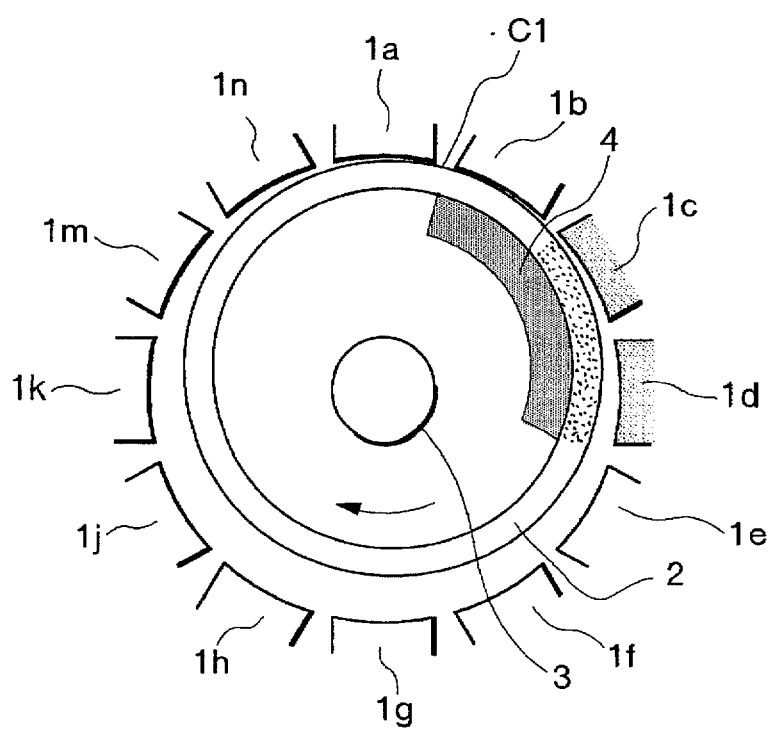
Figure 16:
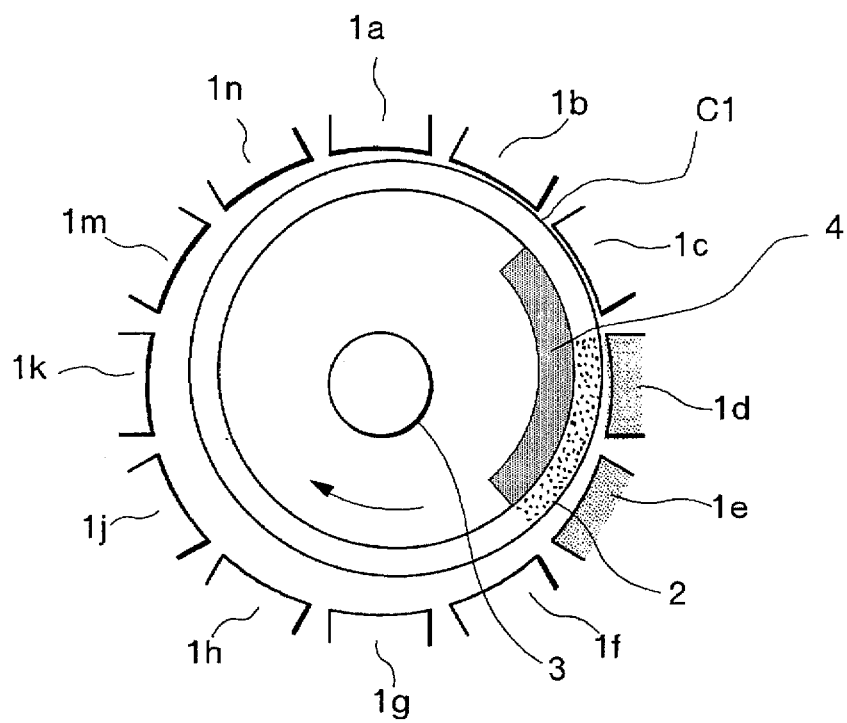
Figure 17:
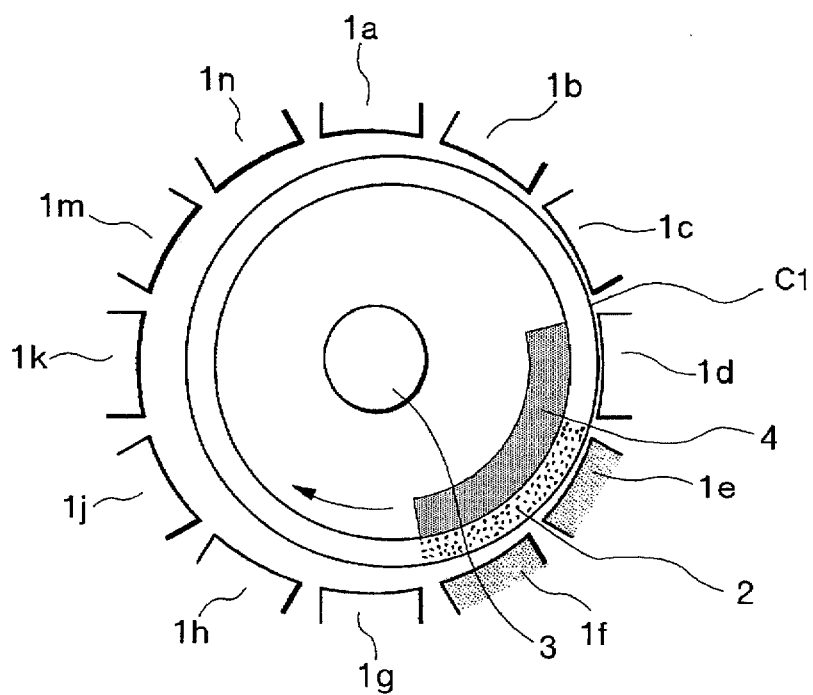

When the rotor 2 is required to rotate in the opposite direction, i.e., the clockwise direction, one end of the permanent magnet member 4 may be positioned at the radially outermost portion C1 as shown in FIG. 14. In FIG. 15, the electromagnets 1c and 1d are excited to attract the permanent magnet member 4 of the rotor 2. As the rotor 2 rotates clockwise, the electromagnets 1d and 1e in FIG. 16, the electromagnets 1e and 1f in FIG. 17 are sequentially energized so as to continuously urge the rotor 2 in the clockwise direction by magnetic attractive force thereof.

Figure 18:
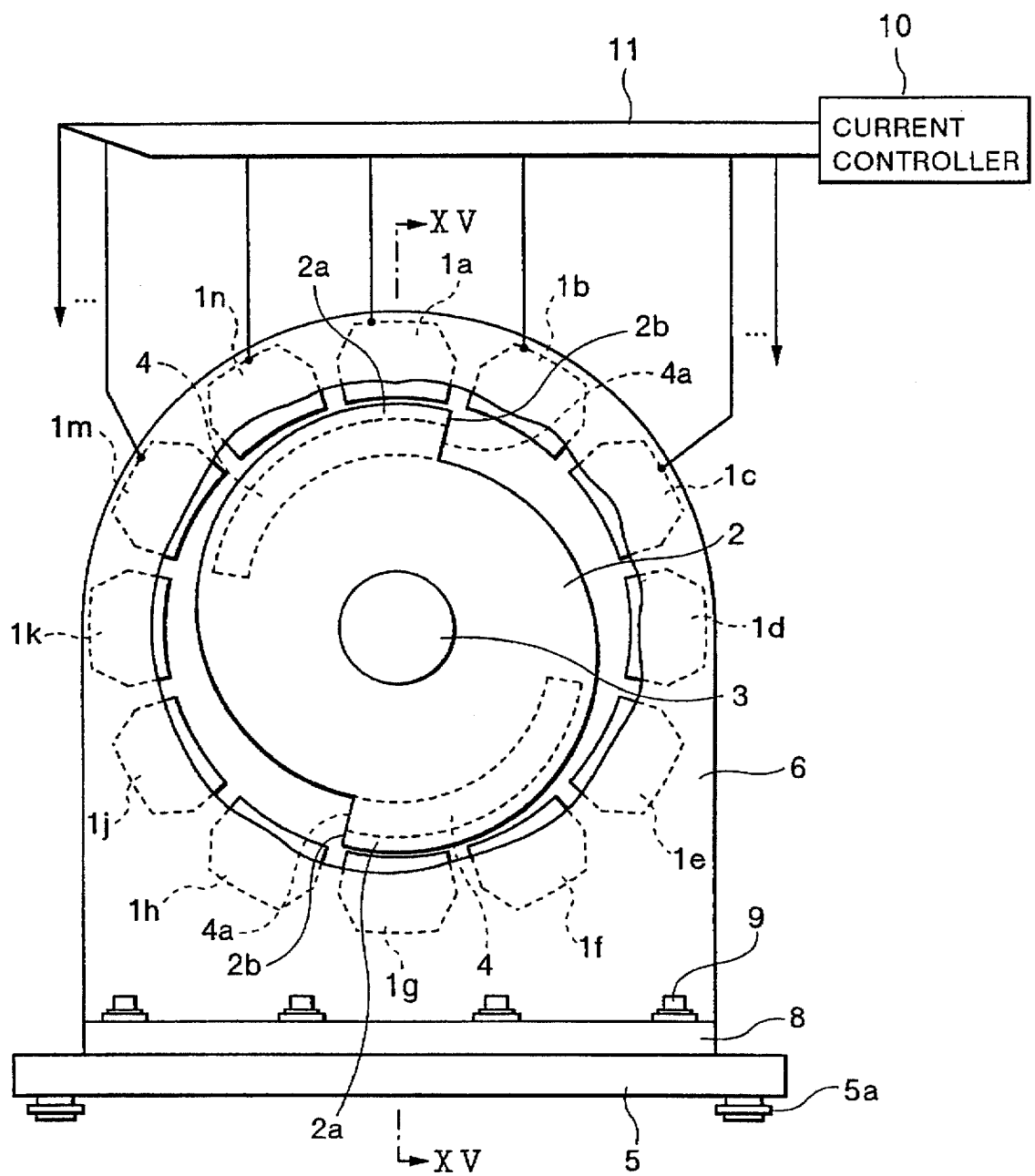
FIG. 18 is a partially-exploded elevation view of an electric motor according to further embodiment of the present invention.
Figure 19:
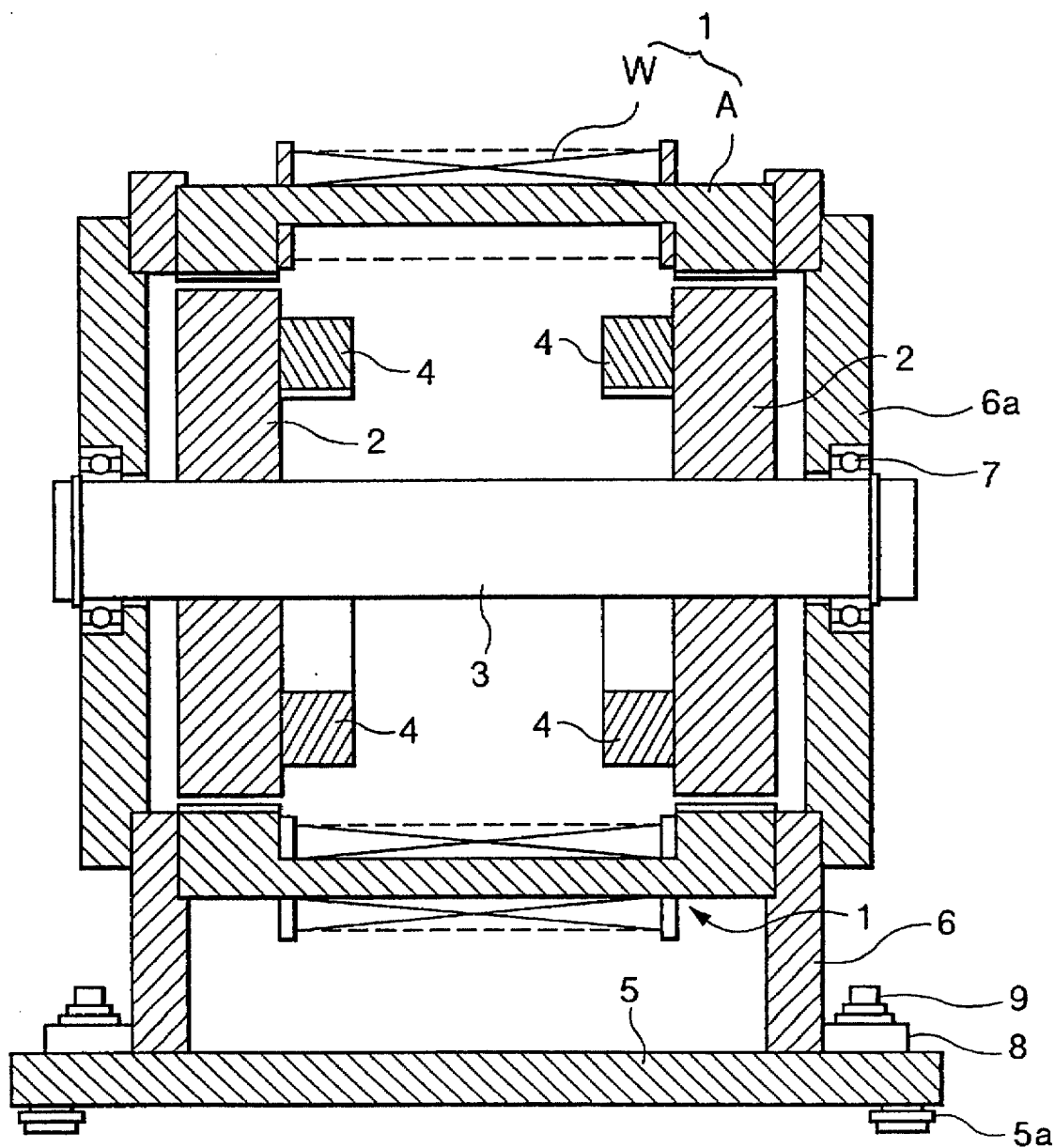
FIG. 19 is a cross-sectional view of the electric motor in FIG. 18.

A further embodiment of the present invention will be described herebelow, referring to FIGS. 18 through 27. As shown in FIGS. 18 and 19, an electric motor of this embodiment includes a rotor 2 of different configuration from those in the aforementioned embodiments. The rotor 2 is substantially a thick round plate with two radially protruding portions 2a. Each rotor 2 will act as a shortened hollow cylindrical member of the preceding embodiments. The protruding portions 2a are symmetrically provided around the center axis of the rotor 2. Between the protruding portions 2a there provided two radially receding peripheral portions of the rotor 2 to define outer peripheral surface that gradually recede from the facing inner periphery of the electromagnets 1a to 1n. The rotor 2 is formed of magnetic material such as ferrous material. Each of the rotors 2 further comprises a plurality of substantially arc-shaped permanent magnet members 4 located at the respective protruding portions 2a thereof. The number of the protruding portions 2a is not limited to two as illustrated, but an appropriate number greater than two can be employed, such as four.

The two rotors 2 are securely fastened by an output shaft 3, which is made of non-ferrous material so that magnetic flux of the permanent magnet members 4 will not be enclosed.

Figure 20:
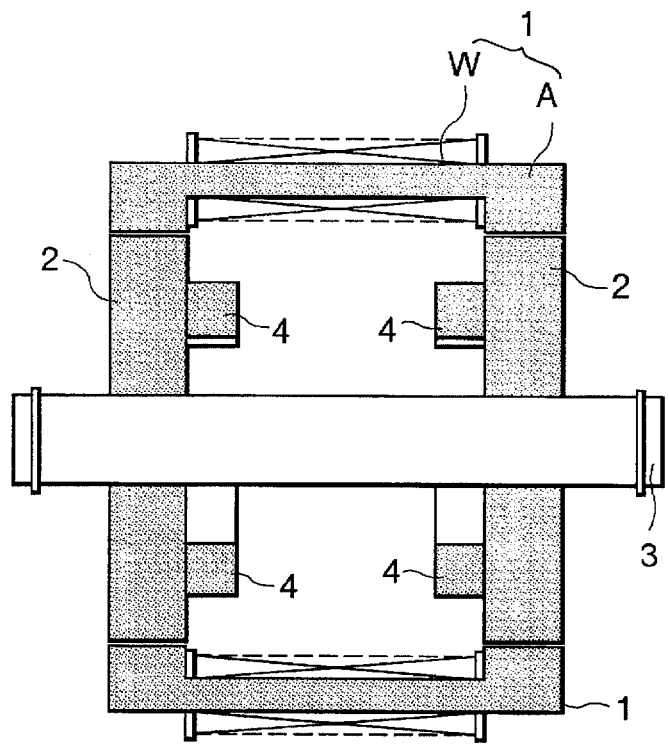
FIGS. 20 and 21 are explanatory views showing convergence of magnetic flux in the electric motor of FIG. 18.
Figure 21:
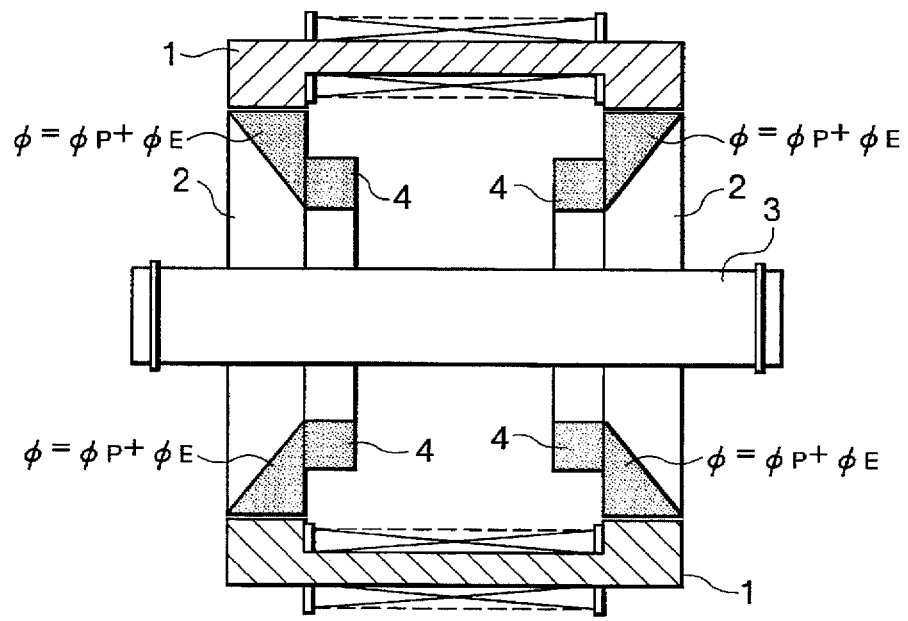

FIGS. 20 and 21 schematically show convergence of magnetic flux of the permanent magnet members 4. In FIG. 20, none of the electromagnets 1a to 1n are energized. Thus, a closed magnetic circuit is established through the permanent magnet members 4, the rotors 2 and the electromagnets 1. In this situation, the rotor 2 is in stable condition since no attractive force is applied by the electromagnets 1. In FIG. 21, the electromagnets 1m, 1n and 1f, 1e are energized and magnetic flux $\phi$ (=$\phi$E+$\phi$P) of the permanent magnet members 4 is converged at the energized electromagnets 1m, 1n and 1e, 1f, respectively.

Figure 22:
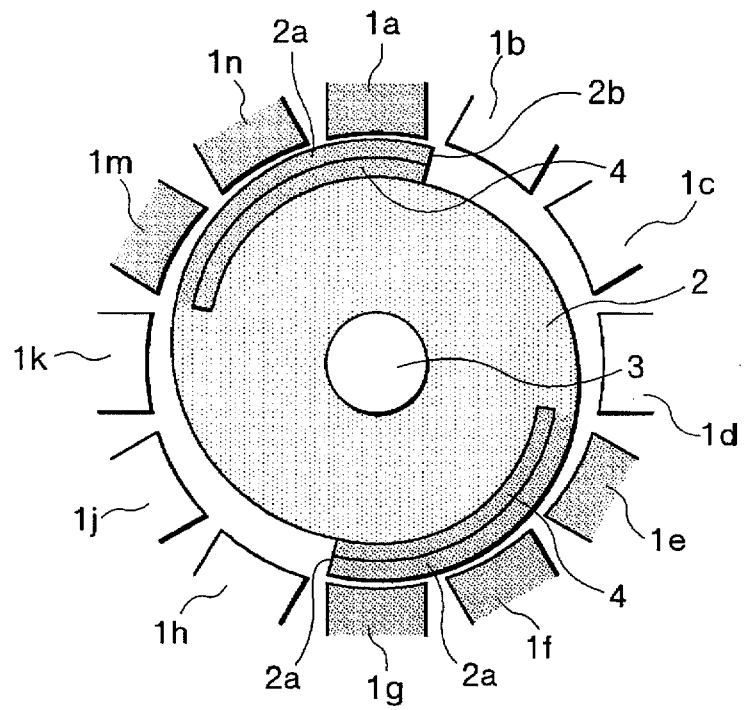
FIGS. 22 through 27 are schematic views illustrating operation of the embodiment of FIG. 18.
Figure 23:
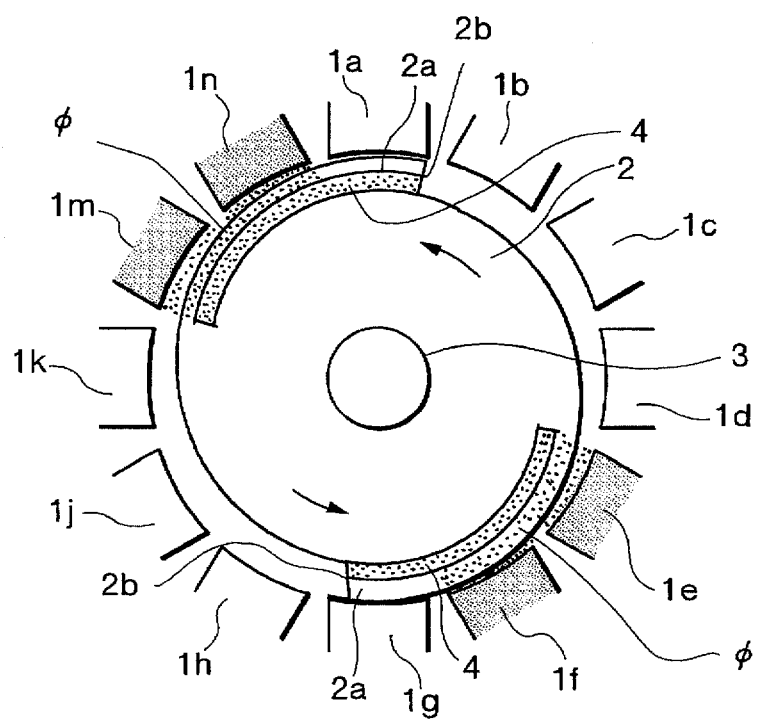
Figure 24:
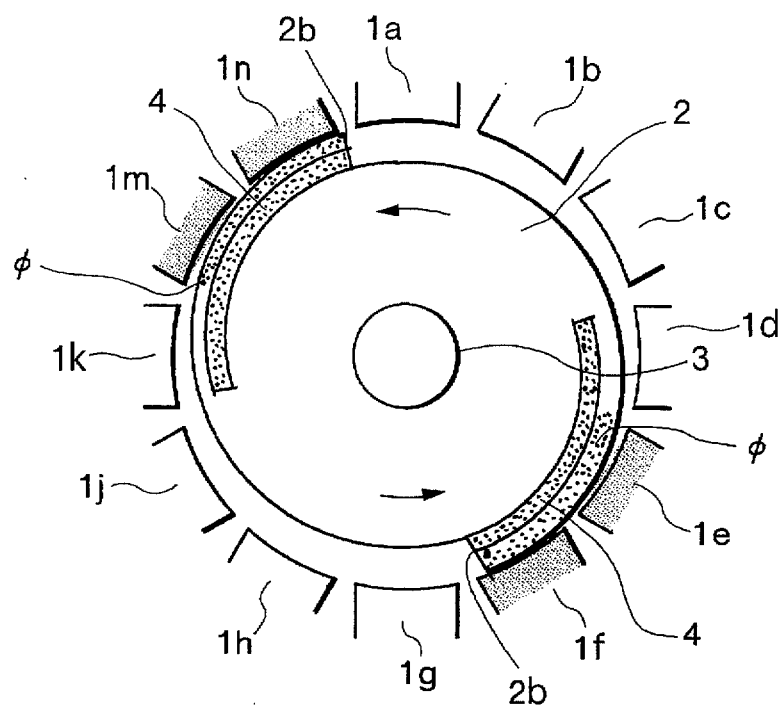
Figure 25:
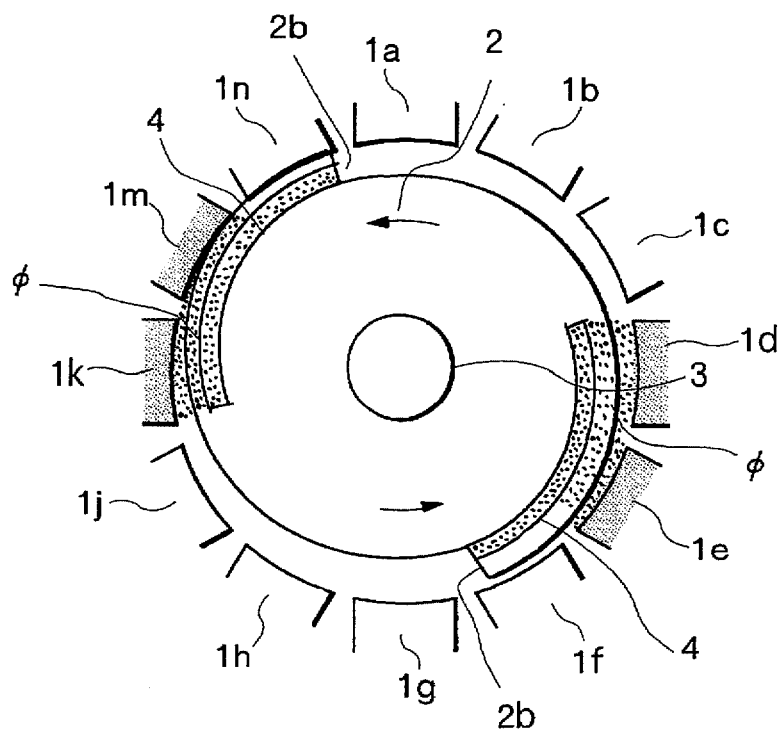
Figure 26:
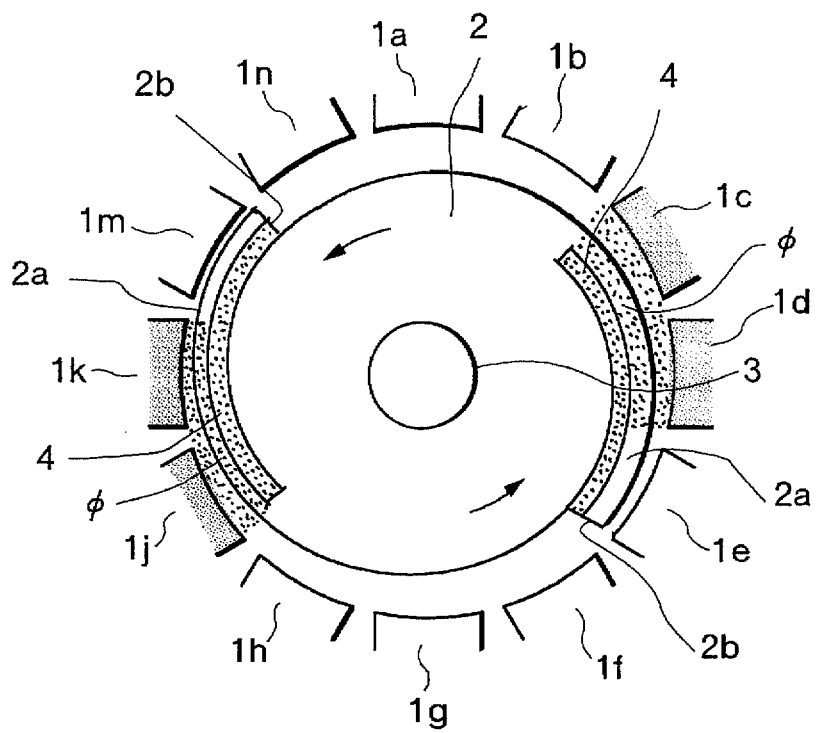
Figure 27:
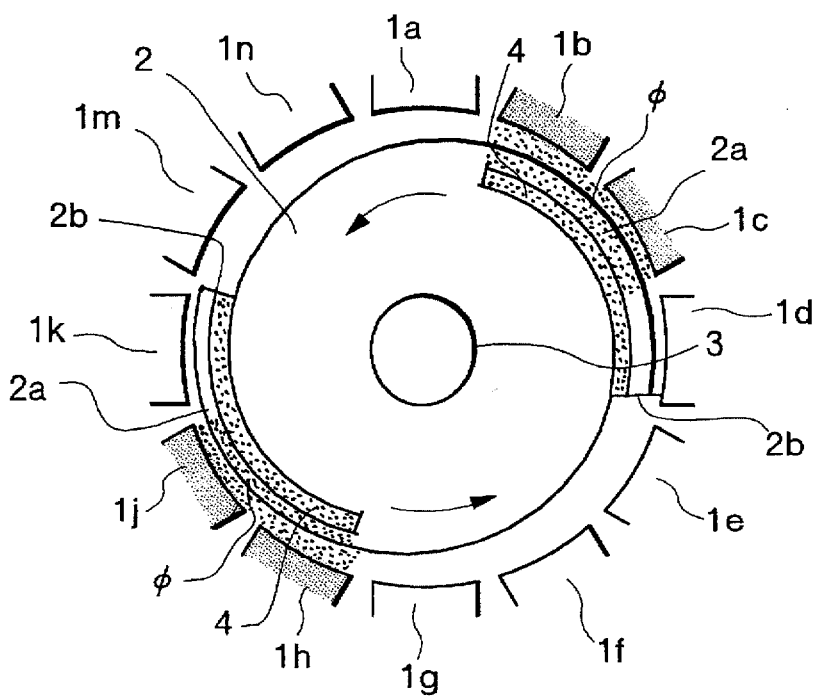
Figure 28:
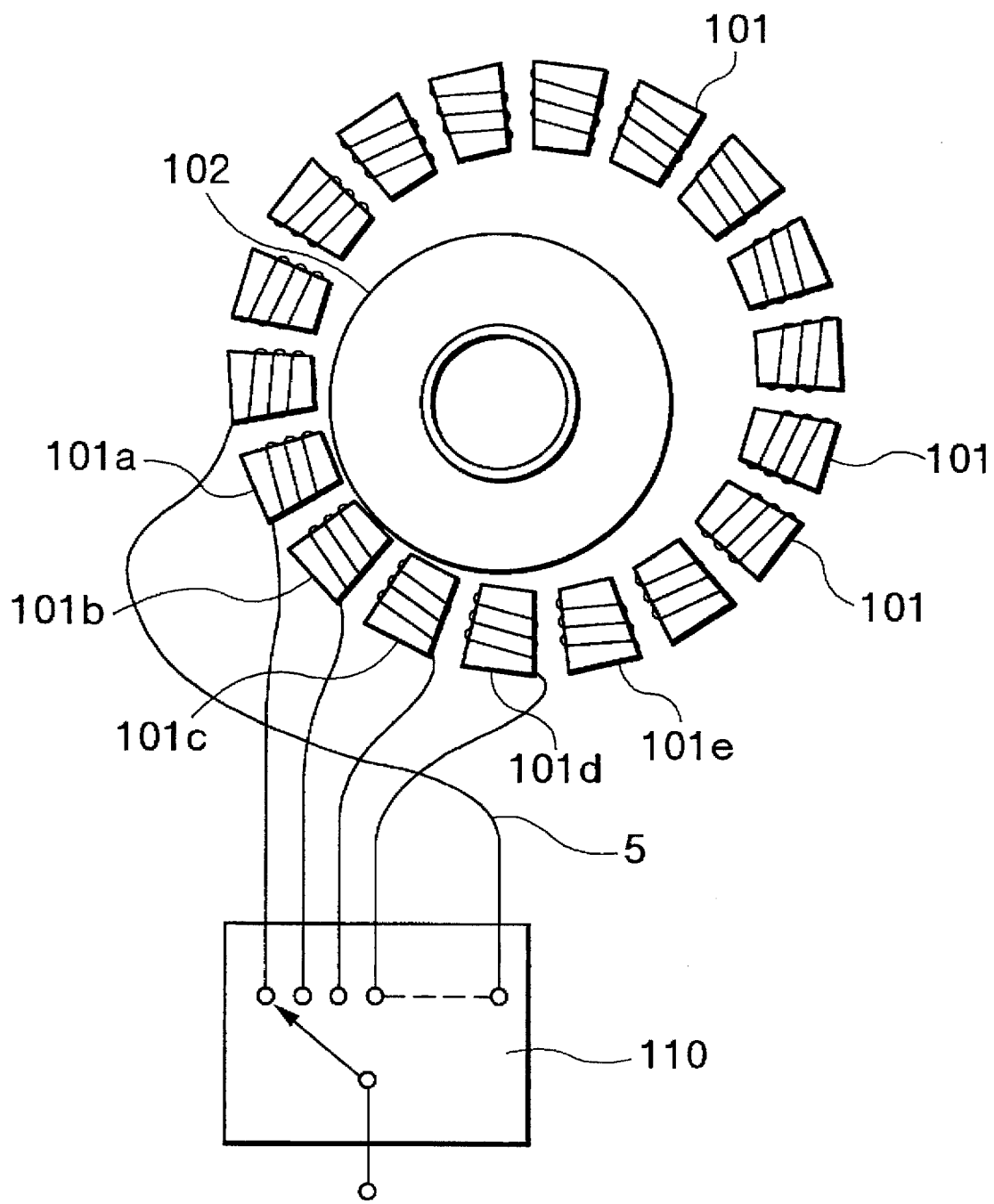
FIGS. 28 and 29 are schematic views of a power generating apparatus of the prior art.
Figure 29:
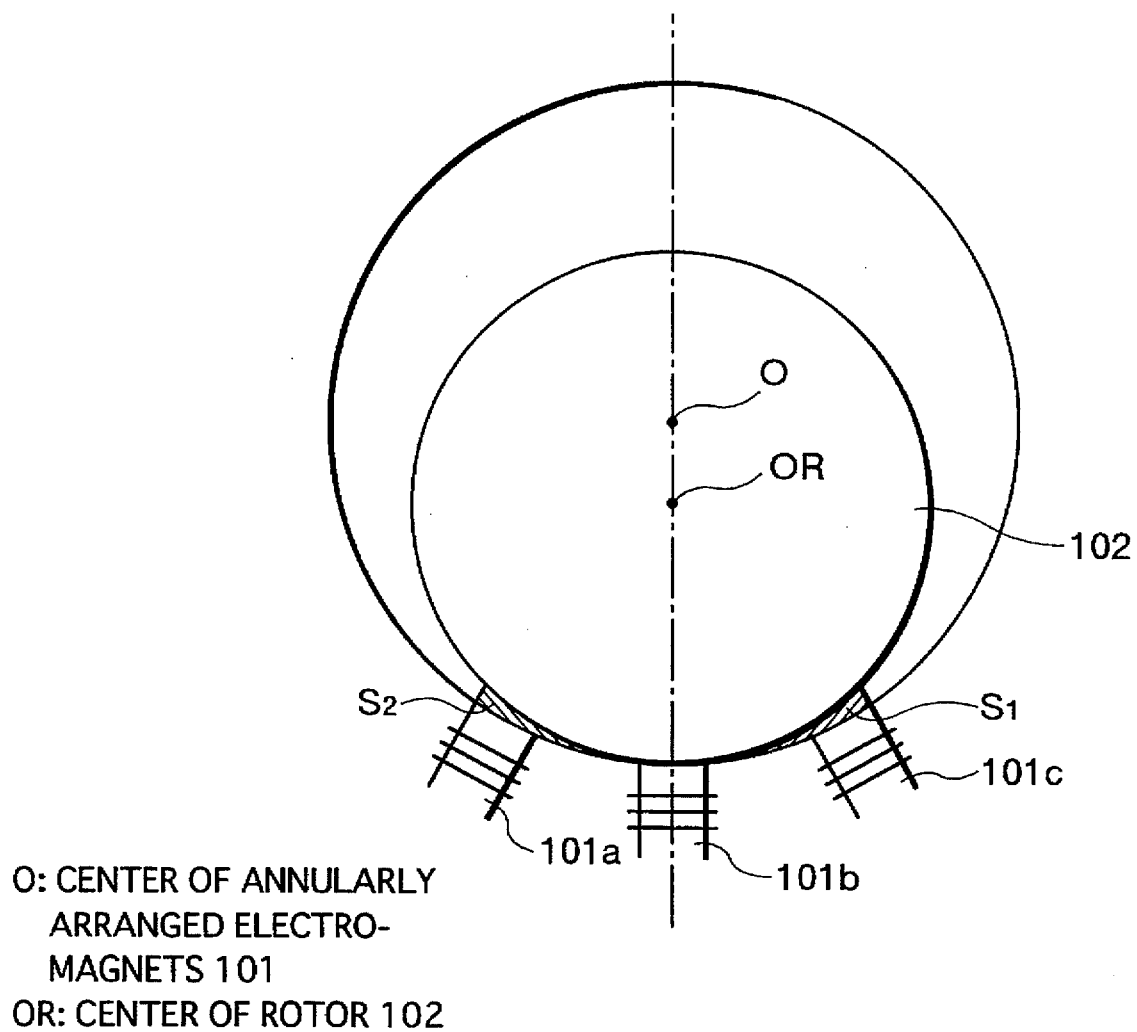

FIG. 22 corresponds to FIG. 20, in which the permanent magnet members 4 oppose to the electromagnets 1m, 1n, 1a and 1e, 1f, 1g. No rotational torque is produced in this condition. In FIG. 23 corresponding to FIG. 21, the electromagnets 1m, 1n and 1e, 1f are energized to attract the substantially arc-shaped permanent magnet members 4 installed in the protruding portions 2a. Due to this attractive force by the electromagnets 1m, 1n and 1e, 1f, the rotors 2 start to rotate counterclockwise as shown in FIGS. 24 through 27. In FIGS. 24 and 25, at the time when the tip end portions 2b of the protruding portions 2a reach the electromagnets 1n and 1f, the electromagnets 1k and 1d are energized instead Of the electromagnets 1n and 1f so as to avoid undesirable forces preventing counterclockwise rotation of the rotors 2. According to the excitation sequence of the electromagnets 1a to 1n, the rotors 2 maintain continuous rotation in the counterclockwise direction.

In order to obtain reverse rotation, i.e. clockwise rotation of the rotors 2 in the present embodiment, rotors shaped in a mirror image of those shown in FIGS. 22 to 27 may be used. The sequence of energizing the electromagnets 1a to 1n, of course, would be reversed. That is, the electromagnets 1a to 1n would be energized sequentially in the clockwise direction to attract the permanent magnet members 4 of the rotors 2 in the clockwise direction. Furthermore, although two sets of electromagnets, for example, 1m, 1n and 1e, 1f are simultaneously energized in this embodiment, an appropriate other number of the electromagnets to be energized may be chosen, based on required performance factors such as rotation torque.

In this embodiment having the rotors 2 with a plurality of protruding portions 2a, since the rotors 2 are balanced during rotation, an additional feature obtained is unbalanced forces will not be applied to the output shaft 3 and the ball bearings supporting the same.

While the present invention has been discussed in terms of preferred embodiments, the present invention may be implemented in various fashions while incorporating modifications of the disclosed embodiments. In addition, omission or modification of the detailed construction may be made without departing from the principle of the invention. Therefore, the present invention should be understood to include all embodiments encompassed within the spirit of the invention set out in the appended claims.

What is claimed is:

1. An electric motor, comprising:

a plurality of electromagnets arranged annularly, each of said electromagnets having a magnetically permeable armature and a winding therearound;

a rotor formed of magnetic material, said rotor comprising a pair of substantially circular plates of magnetic material and an axis integrally fastening said circular plates to each other, said rotor being rotatably supported within and surrounded by said annularly arranged electromagnets, each of said substantially circular plates having a plurality of radially protruding portions, each of which is defined by a radially recessed outer peripheral surface of said circular plate;

a plurality of substantially arc-shaped permanent magnet members positioned at respective said protruding portions, each of said permanent magnet members being disposed along a respective said radially recessed outer peripheral surface of a respective said circular plate of said rotor;

an output shaft fixed to said rotor for outputting rotational motion of said rotor so that at least one portion of an outer periphery of said rotor is able to approach or contact an energized one of said electromagnets by attracting force thereof; and means for energizing said electromagnets in a predetermined sequence and timing to achieve energization of at least one said electromagnet, among said annularly arranged electromagnets, which is situated at a downstream side, relative to a rotational direction of said rotor, of a point on an outer periphery of said rotor that is closest to said electromagnets.

2. An electric motor as set forth in claim 1, wherein at least two said protruding portions are provided at an outer periphery of each said circular plate at portions that are symmetrical with respect to a center axis of said rotor.

3. An electric motor as set forth in claim 1, wherein each said permanent magnet member is disposed in a substantially half portion of said rotor including said closest point of said rotor to said electromagnets.

4. An electric motor, comprising:

a plurality of electromagnets arranged annularly, each of said electromagnets having a magnetically permeable armature and a winding therearound;

a rotor including a pair of substantially circular plates, each of said circular plates having protruding from an outer periphery thereof a plurality of radially protruding portions and an output shaft formed of non-ferrous material securely fastening said circular plates centrally thereof so that said radially protruding portions of said circular plates are disposed parallel to each other;

a plurality of substantially arc-shaped permanent magnet members disposed at respective of said radially protruding portions;

a pair of side frames having ball bearings and supporting said output shaft of said rotor;

a base frame on which said side frames are securely disposed; and a current control device for supplying electric current for energizing said electromagnets in a predetermined sequence and timing to achieve energization of at least one said electromagnet, among said annularly arranged electromagnets, a downstream side, relative to a rotational direction of said rotor, of a point on an outer periphery of said rotor that is closest to said electromagnets.

\* \* \* \* \*